(12) United States Patent
Chen et al.

(10) Patent No.: US 6,492,636 B1
(45) Date of Patent: Dec. 10, 2002

(54) LARGE SCALE HIGH SPEED MULTIPLEXED OPTICAL FIBER SENSOR NETWORK

(75) Inventors: Shiping Chen, Greenbelt, MD (US); Yiqun Hu, San Jose, CA (US)

(73) Assignee: The University of Maryland, College Park, MD (US)

( * ) Notice: Subject to any disclaimer, the term of this patent is extended or adjusted under 35 U.S.C. 154(b) by 0 days.

(21) Appl. No.: 09/463,008

(22) PCT Filed: Aug. 19, 1998

(86) PCT No.: PCT/US98/17142
§ 371 (c)(1),
(2), (4) Date: Jan. 19, 2000

(87) PCT Pub. No.: WO99/09370
PCT Pub. Date: Feb. 25, 1999

Related U.S. Application Data
(60) Provisional application No. 60/056,560, filed on Aug. 19, 1997.

(51) Int. Cl.[7] .................................................. G01N 3/80
(52) U.S. Cl. ............................ 250/227.14; 250/227.15; 385/12
(58) Field of Search ........................ 250/227.14, 227.15, 250/227.16, 227.18, 227.19; 385/12

(56) References Cited

U.S. PATENT DOCUMENTS

| | | | | |
|---|---|---|---|---|
| 5,513,913 A | | 5/1996 | Ball et al. | |
| 5,723,857 A | * | 3/1998 | Underwood et al. | 250/227.14 |
| 5,748,312 A | * | 5/1998 | Kersey et al. | 250/227.23 |
| 5,798,521 A | * | 8/1998 | Froggatt | 250/227.14 |
| 5,818,585 A | * | 10/1998 | Davis et al. | 356/35.5 |
| 5,982,791 A | * | 11/1999 | Sorin et al. | 359/247 |
| 6,304,696 B1 | * | 10/2001 | Patterson et al. | 359/130 |

FOREIGN PATENT DOCUMENTS

| | | |
|---|---|---|
| GB | 2 268 581 A | 1/1994 |
| WO | WO 96 11383 A | 4/1996 |

* cited by examiner

*Primary Examiner*—Stephone Allen
(74) *Attorney, Agent, or Firm*—Dykema Gossett, PLLC

(57) ABSTRACT

A digital spatial and wavelength domain system for multiplexing fiber Bragg grating sensors comprises: a plurality of optical fibers, each including a plurality of fiber Bragg gratings therein, each fiber Bragg grating having a selective center wavelength that is variable in accordance with strain for reflecting or transmitting light at the corresponding center wavelength in accordance with the strain thereat; means for providing broad band illumination (110) for the fiber Bragg gratings; means for each optical fiber for carrying the light to a selected location; and a wavelength dispersion device (136) responsive to the light from each of the fibers for wavelength separating the light in each fiber into the center wavelengths in accordance with the location of each fiber so that the selected location of each fiber and the wavelength separated light provides spatially independent signals for each fiber Bragg grating in each optical fiber.

19 Claims, 7 Drawing Sheets

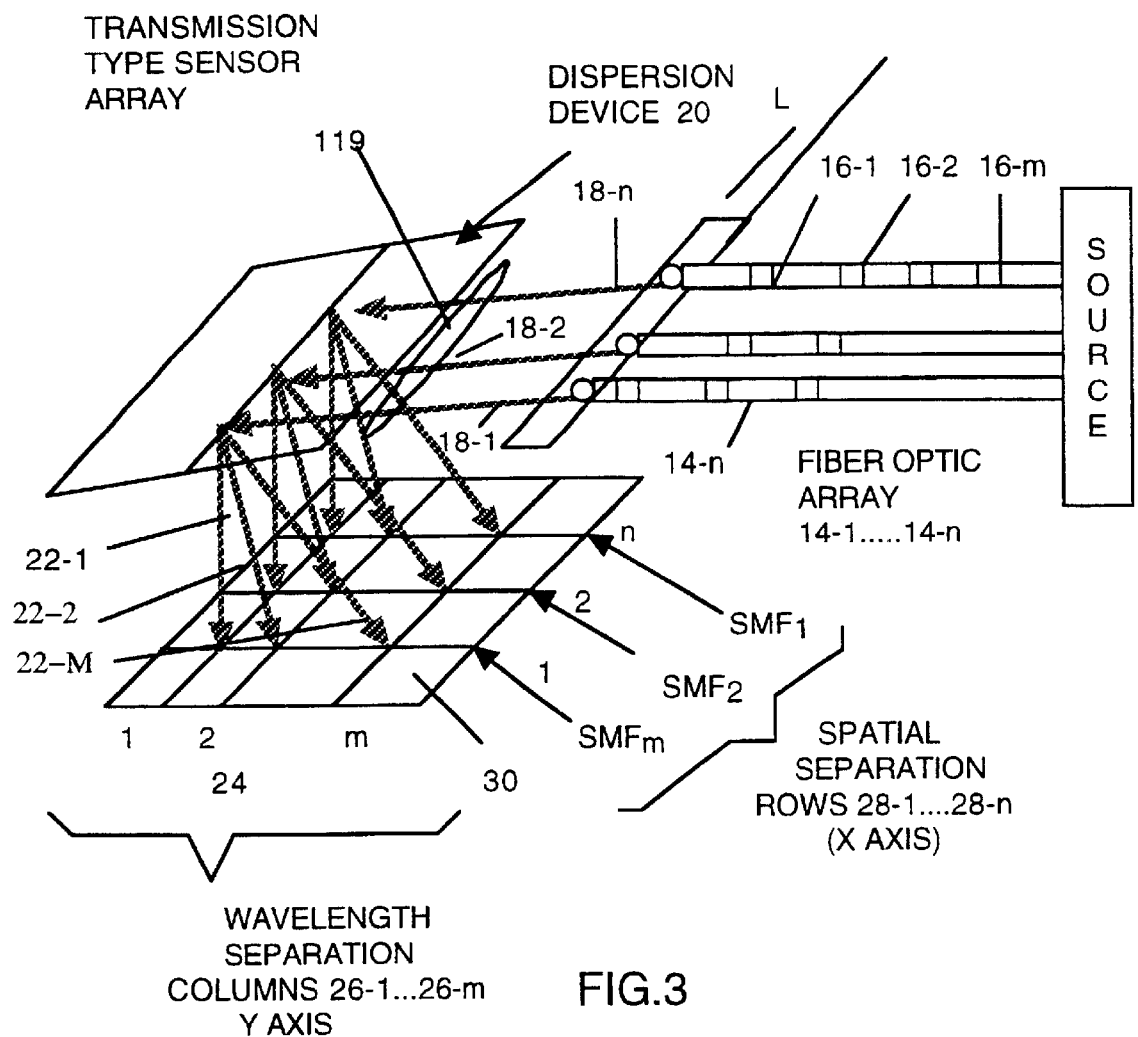

LARGE SCALE HIGH SPEED MULTIPLEXED OPTICAL FIBER SENSOR NETWORK

This Application claims the benefit of No. 60/056,560, filed Aug. 19, 1997.

BACKGROUND OF THE INVENTION

The invention relates to a method and apparatus for multiplexing signals. More particularly, the invention relates to a method and apparatus for de-multiplexing optical signals in the spatial and wavelength domains employing a dispersion device optically coupled to a random access two dimensional imager and employing software for sub-pixel interpolation.

Optical fiber sensor systems employ multiplexing techniques to allow the sharing of a source and processing electronics to reduce the per sensor cost and thereby improve the competitiveness of such systems. In addition, component sharing helps to reduce the overall weight of the system and enhances robustness. A variety of multiplexing technologies are known including spatial, wavelength, frequency and coherence domain multiplexing. However, the multiplexing capacity of any of these techniques is generally limited to about ten sensors due to various factors including speed, cross talk, signal to noise ratio and wavelength bandwidth. Some systems employ two or more techniques to increase multiplexing capacity. In particular spatial domain multiplexing is advantageously combined with other techniques, generally because it does not degrade system performance.

Fiber optic Bragg gratings (FBG) have become one of the most successful of the optical fiber sensors available. These devices are generally compact, have absolute wavelength encoding, and have the potential for mass production. Sensor signals may be wavelength encoded rather than intensity encoded. Thus the sensed signal is independent of power variations in the light source and system losses. Additionally, an array of FBG sensors can be readily made by connecting several FBGs having different center wavelengths in a line along a length of fiber. Each FBG may be individually addressed using wavelength multiplexing in the wavelength domain. However, wavelength domain alone can only accommodate a relatively small number of FBGs, because a broad band source optical fibers has only a limited bandwidth. Accordingly, it is desirable to employ combined multiplexing techniques to increase the capacity of the system.

Conventional spatial multiplexing locates sensors into many fiber channels and may employ a separate electronic signal processing unit for each channel. Such a system may be improved by using an optical fiber switch as a special case of spatial multiplexing, thereby allowing multiple fiber channels to share a single processing unit. However, the speed of the system, measured as the sample rate of each sensor is considerably reduced because of the optical switch, for example, 60 FBGs at a sample rate of 1 Hz. Certain applications such as monitoring aerospace structures or process control and massive data collection require higher multiplexing capacity, and particularly, a higher sampling rate are desirable.

A digital space and wavelength domain multiplexing technique, employing multiple fiber channels, sharing a processing unit, has been reported by the inventors herein. Single channel systems with multiple FBGs employ a dispersion device and line scan camera. The system is only a single domain device and the system is limited to one dimension and therefore it can only address a limited number of sensors.

SUMMARY OF THE INVENTION

The present invention seeks to overcome and obviate the disadvantages and limitations of the described prior arrangements. In particular, the invention is based upon the discovery that a large scale, high speed optical fiber sensor network may be provided which has wavelength and spatial multiplexing using a dispersion device an a two dimensional (2D) image sensor to distinguish a plurality of fiber channels on one axis and FBG wavelengths along another. An exemplary embodiment employs a random access 2D imaging device and a sub-pixel interpolation algorithm for resolution enhancement.

In an exemplary embodiment, the invention comprises the broad band source, a coupler for distributing the source to multiple fiber channels each including a plurality of fiber brag gratings (FBGs) therealong. The FBGs in each fiber each have a different center wavelength and the reflected signals from each FBG are carried by a down-lead fibers. The down-lead fibers are arranged along a line in a 1D array at the input port of a wavelength selective dispersion device. The reflected light is passed through the dispersion device which separates the reflected light by wavelength and directs the light to a 2D solid state image sensor. In the exemplary embodiment the 2D sensor is a random access device to thereby improve data acquisition speed. A sub-pixel interpolation algorithm is employed to enhance resolution.

In another embodiment the wavelength selective dispersion device, the 2D random access imaging device, and an in-line fiber optic input array may be combined as a module. A broad band source and a coupler for distribution to multiple fiber channels may be another module. The modules may be operated separately or combined in a single unit.

The FBG sensor is generally sensitive to both temperature and strain. In accordance with the invention. FBG arrays may be produced with temperature and strain sensitivity combined or separated. FBS array may also be adapted to sense physical characteristics which may be readily converted to a strain measurement.

BRIEF DESCRIPTION OF THE DRAWINGS

The invention will now be described with reference to the accompanying drawings, wherein

FIG. 3 is an embodiment illustrating a transmission type array:

DESCRIPTION OF THE INVENTION

Figure 1:
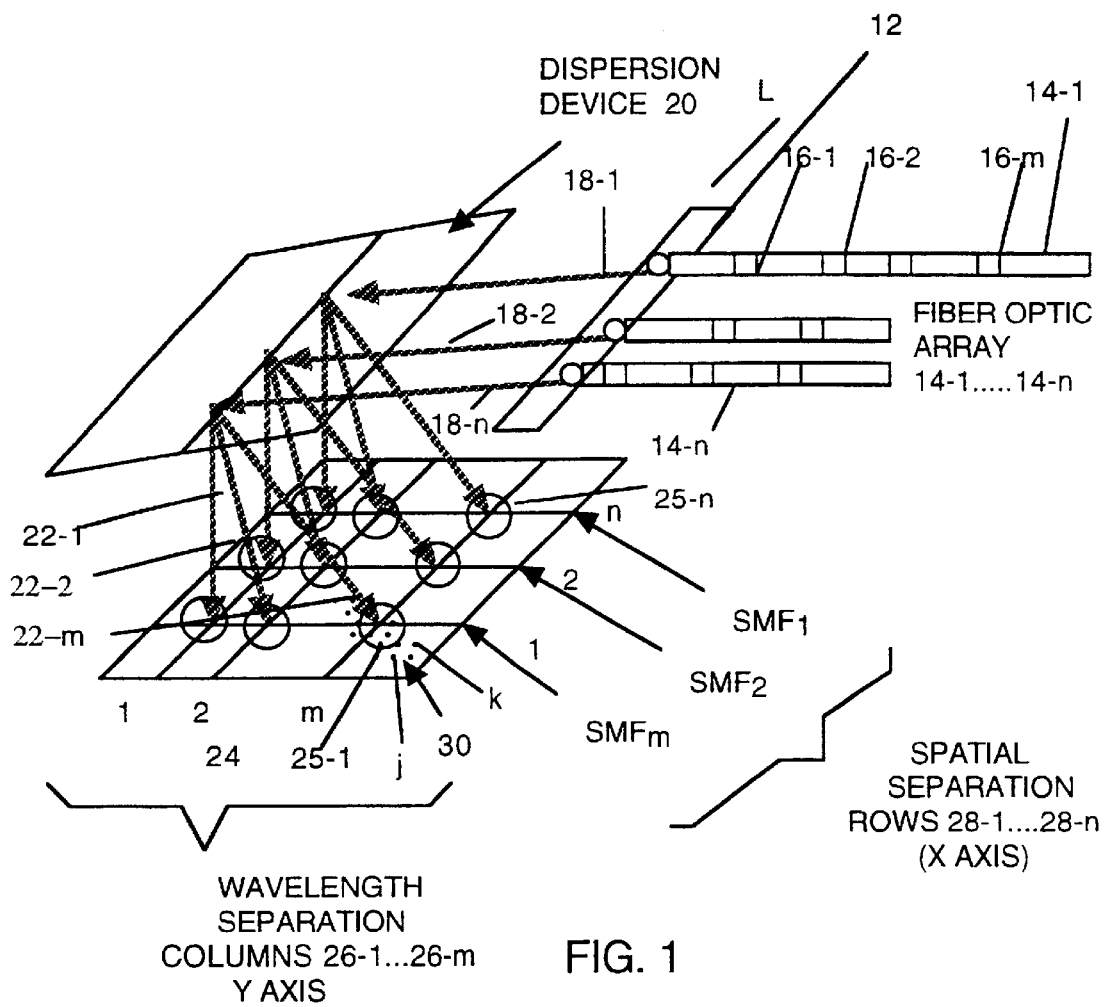
FIG. 1 is a generalized illustration of a wavelength and spatial domain multiplexing device according to the present invention.
Figure 1A:
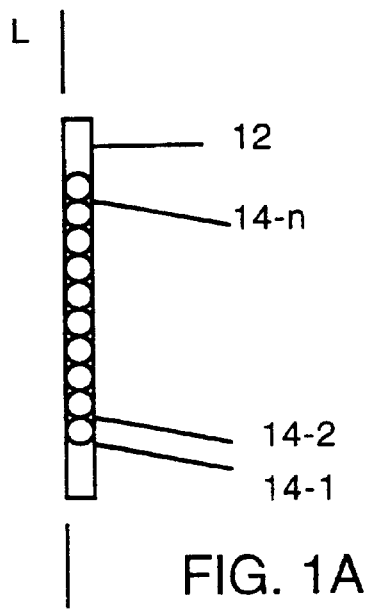
FIG. 1A is a detail of a 1D fiber output array.

FIG. 1 generally illustrates the operative principle of the present invention in which a fiber optic array 12 of channels 14-1 . . . 14-n having a plurality of FBG sensors 16-1 . . . 16-m produce outputs 18-1 . . . 18-n. The light in each output is a signal containing a plurality of discrete wavelengths centered at selected wavelengths corresponding to the center wavelengths of the respective FBGs 16-1 . . . 16-m. The fiber optic channels 14-1 . . . 14-n are disposed side by side and spatially separated along a line L as shown in FIG. 1A. The likewise spatially separated light outputs 18-1 . . . 18-n are directed at the dispersion device 20 which separates each signal into a plurality of corresponding wavelength separated signals 22-1 . . . 22-m for each fiber, which signals are directed towards 2D image sensor 24 and which form spots 25-1 . . . 25-n thereon.

Figure 1B:
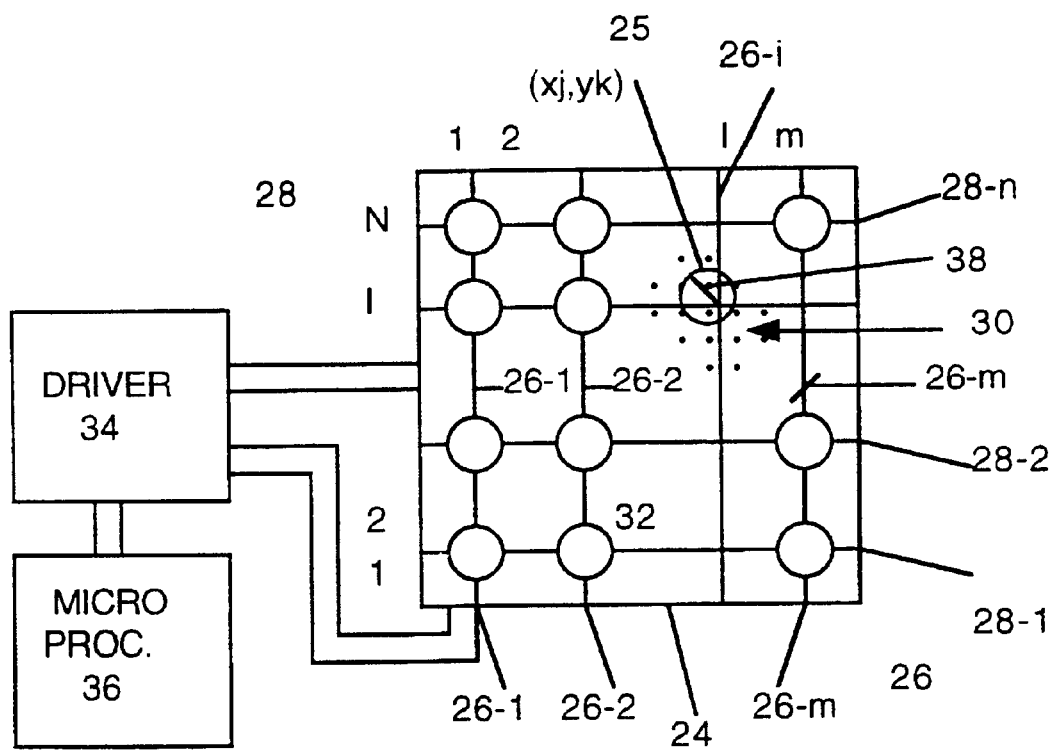
FIG. 1B is a schematic illustration of a random access image sensor and driver.

The sensor 24 is a two dimensional (2D) image sensor 24 having k columns 26 and j rows 28 of pixels 30 formed therein where k & j are much larger than m & n so that a spot 25 falls on a cluster of pixels 30. As can be seen in FIG. 1B, the wavelength separated spots 25-1 . . . 25-n in each channel fall more or less into the various columns 26-1 . . . 26-m of the image sensor 24 and cover a cluster of pixels 30 along a row 28-1 corresponding to the location of the first fiber optic channel 14-1 in the array 12. Likewise, the rows 28-2 . . . 28-n correspond to the positioning of the respective fiber optic channels 14-2 . . . 14-n respectively. The columns 26 represent wavelengths. For example, the signal 18-1 is broken up into wavelengths 22-1 . . . 22-m corresponding to the number of FBG and form spots near the columns 26-1 . . . 26-m covering clusters of pixels 30 therein as shown. Each unique pixel coordinate (xj, yk) on the sensor 24 provides information about the corresponding signal carried by the fiber optic array 12 the weighted center of the light falling on the pixels 30 under each spot 25 is a member of its wavelength and thus provides a strain measurement.

Figure 1C:
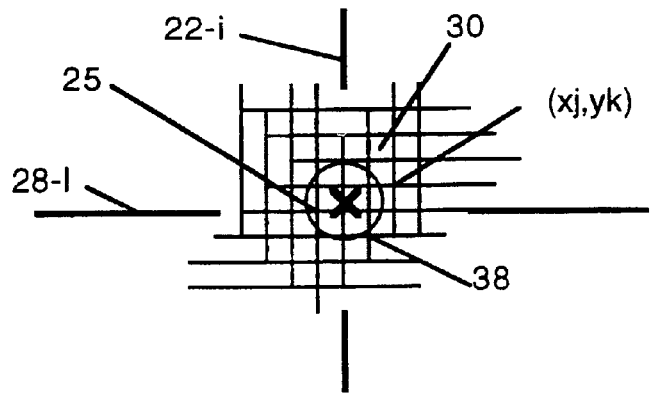
FIG. 1C is a fragmenting illustration of a portion of the image sensor illustrating the output spot and pixels.

In the exemplary embodiment of the invention shown in FIGS. 1, 1B, & 1C the sensor 24 may be a randomly accessible device such as a CMOS imager which allows any selected pixel 30 (xj, yk) or a cluster of pixels to be randomly addressed and read out as opposed to a system which requires sequential scanning of each pixel on the entire imager.

Figure 1D:
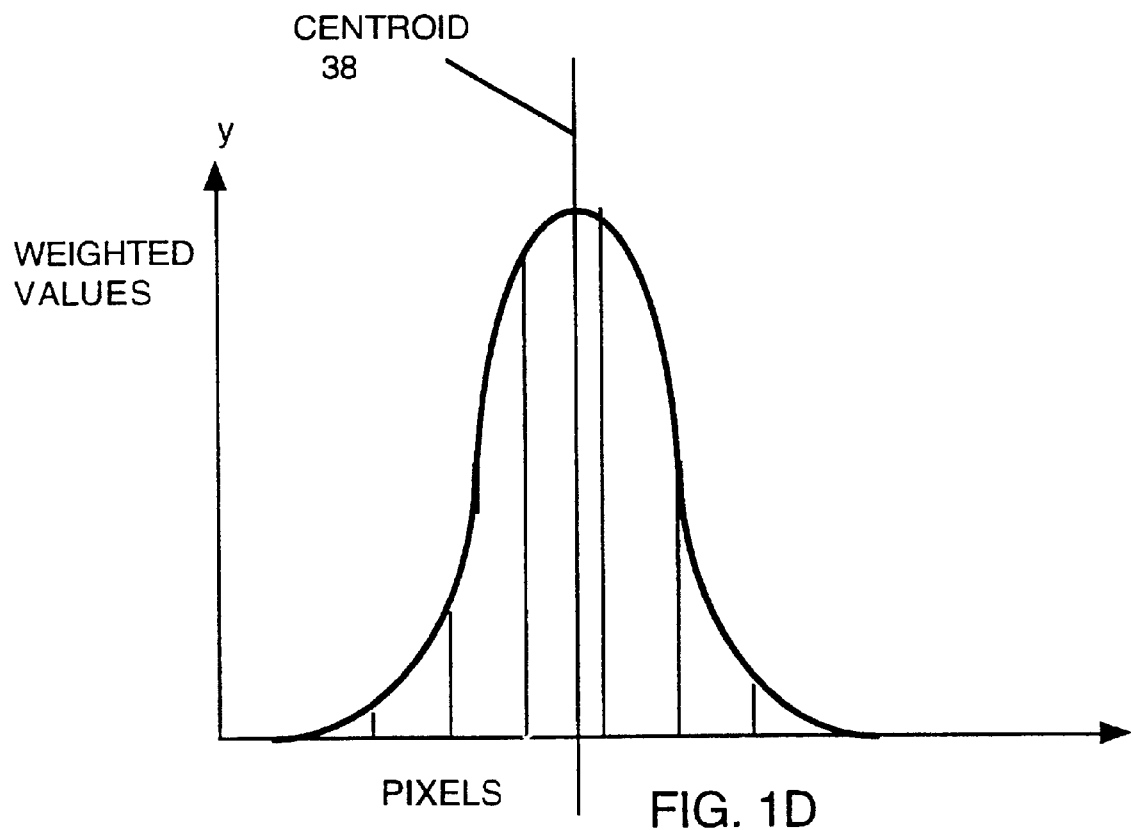
FIG. 1D is a plot illustrating a weighted algorithm in linear and logarithmic form.

As shown in FIGS. 1B & 1C, light signals 22-1 . . . 22-m appear as spots 25 on the image sensor 24 covering more or less pixel clusters 30, along rows and columns as shown. A driver device 34 which may be suitably driven by a programmed computer or microprocessor 36 selectively reads data from the x,y coordinates of the sensor by selectively addressing the pixel cluster 30 located at or near the spot locations. Information as to the position of the spot 25 relative to each of the corresponding proximate pixel clusters 30 may be processed to determine the precise central location or centroid 38 at (xj,yk) of the spot 30 in the pixel array. The location of the spot 25 may be accurately determined by sub-pixel interpolation. In an exemplary embodiment, the centroid 38 shown as a cross in FIGS. 1B & 1C, is the weighted average of the illuminated pixels under spot 25. The technique of sub-pixel interpolation using known algorithms allows for resolution at a sub-pixel level and thus provides highly accurate measurements of strain. The centroid interpolation technique determines the centroid 38 which represents the weighted average of the spot 25 over the pixels 30. FIG. 1D graphically shows centroid interpolation for FIG. 1C. Other algorithms include curve fitting; and linear or higher order interpolation.

Figure 1E:
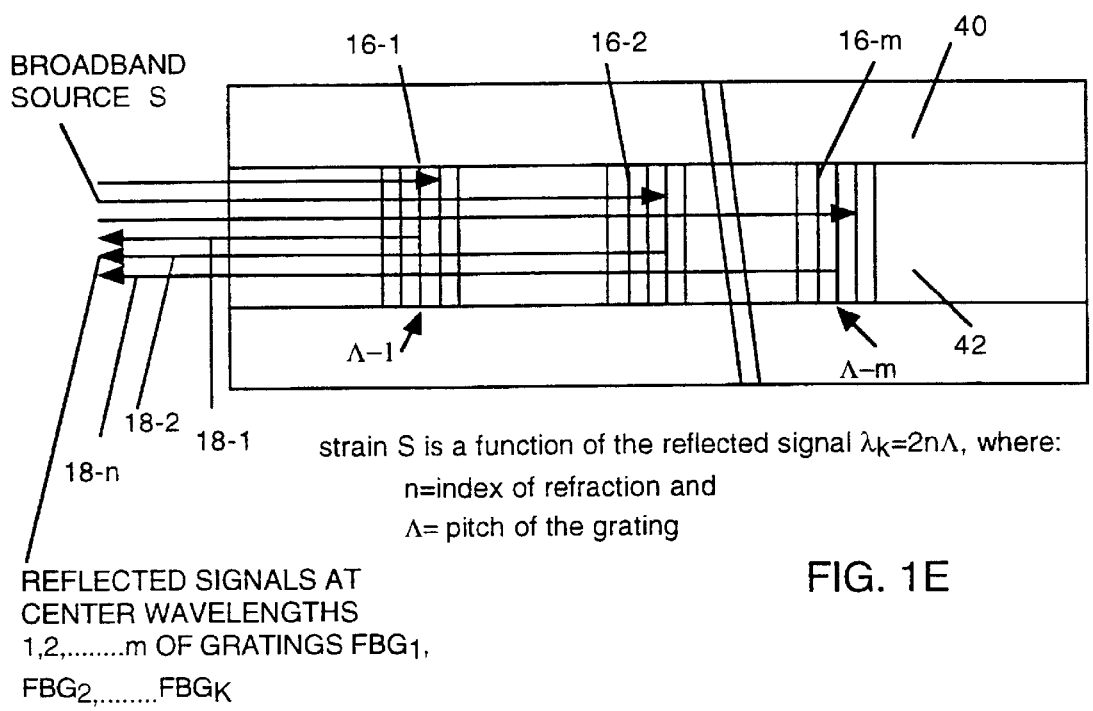
FIG. 1E is a generalized illustration of the operation of a fiber Bragg grating.

In accordance with the invention, the wavelength of the various components making up the light 18-1 . . . 18-n represents a measured parameter. For example. FIG. 1E shows a broad band source S coupled to an optical fiber 40 having m fiber Bragg gratings 16-1 . . . 16-m. Each has a corresponding pitch $\Lambda$-1 . . . $\Lambda$-m developed as a change in the refractive index of the core 42. The pitch is related to a corresponding center wavelength $\lambda$-1 . . . $\lambda$-m is proportional to the pitch $\Lambda$-1 . . . $\Lambda$-m respectively. As the strain on the FBG 16-1 . . . 16-m changes, the pitch $\Lambda$-1 . . . $\Lambda$-m likewise changes causing the center wavelength of the corresponding reflected signal 22-1 . . . 22-n to change accordingly. A change in the wavelength is reflected as a slight shift in the position of the spot in the sensor corresponding to the change in the pitch of the FBG. It should be understood that temperature also can change the pitch and thus the wavelength.

If a plurality of FBGs 16-1 . . . 16-m are formed in the core 42 of the fiber 40, multiple parameters may be sensed using the same fiber to carry plurality of signals. The problem, of course, as noted above, is to separate the various reflected signals 22-1 . . . 22-n using the multiplexing techniques of the present invention. As the wavelength changes, the dispersion device 20 causes a shift in the column position of the wavelength separated signal which corresponds to an indication of increasing or decreasing strain. For each of the spots 25-1 . . . 25-m in each row 28-1 . . . 28-n on the sensor 24 a unique strain measurement may thus be obtained.

Figure 2:
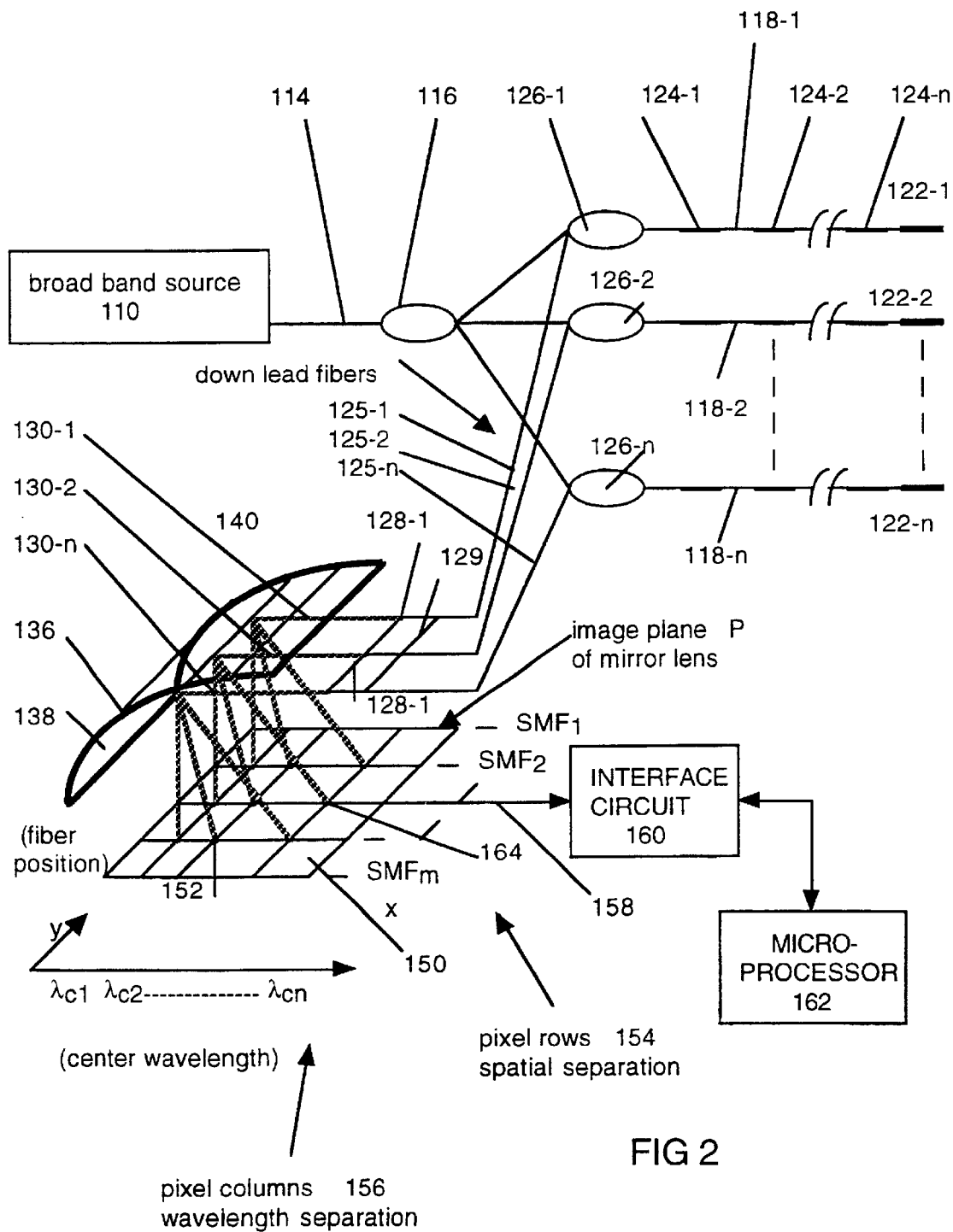
FIG. 2 is a more specific illustration of an apparatus for achieving spatial and wavelength domain multiplexing in accordance with the present invention.

FIG. 2 illustrates in further detail an exemplary embodiment of a large scale, high speed optical fiber sensor network 100 in accordance with the invention. The system includes a broad band light source 110. Light from the source is coupled by a lead fiber 114 to a star coupler 116. The light is split to feed a plurality of single mode fibers 18-1 . . . 118-n, one for each channel. Each fiber has a plurality of fiber Bragg gratings (FBGs) 120-1 . . . 120-m, each with the predetermined different central wavelength $\lambda$1 . . . $\lambda$m respectively. In the arrangement illustrated, the end of each fiber has a compensating temperature sensor 122-1 . . . 122-n. Light reflected by the FBGs in each channel is coupled to down-lead fibers 125-1 . . . 125-n by a coupler 126-1 . . . 126-n in each channel. The free ends 128-1 . . . 128-n of the fibers 118 are arranged in a linear fiber bundle array 129 along line L. See, for example, the end view of the fiber array 12 in FIG. 1A in which the fibers are arranged side by side along line L. Output light 130-1 . . . 130-n from each the corresponding fiber end is directed at a dispersion unit 134 which comprises a mirror lens 136 formed with a grooved grating 138 on the reflective surface as shown. Grooves 140 in the grating are arranged parallel to the line L of the fiber end faces.

The mirror 136 can form an image of the fiber array on an image plane P as shown. A solid state image sensor 150 comprising an j by k array of pixels 152 is disposed in the image plane P as shown. Pixel rows 154 correspond to the position of the channels established by fiber ends 128-1 . . . 128-n along the line L. The pixel columns 156 correspond to the number of fiber gratings FBG1 . . . FBGn in the corresponding wavelengths $\lambda$1–$\lambda$n.

The sensor 150 is positioned in such a way that the pixel columns 156 (y axis) are parallel to the grooves 140 in the grating 138 and to the line L of the fiber end faces 128-1 . . . 128-n. In addition, the surface of the sensor 150 coincides with the image plane P of the mirror lens 136.

The detector 150 has an output 158 which is connected to an interface circuit 160 for processing by a microprocessor 162. It should be understood that the grating and lens is one of a variety of possible dispersion devices which may be employed.

In accordance with the invention, n fiber channels and m FBGs of different wavelengths along each fiber form an n by m matrix of bright spots 164 on the detector array 150. Each column 156 in the matrix represents the FBGs of the same or similar wavelength in different fiber channels, and each row represents different FBGs along the same fiber. In other words, the spatial positions of the fiber channels are encoded onto the position along the y axis of the detector while the wavelengths are encoded along the x axis. The precise central wavelength of an FBG in a particular channel can therefore be detected by locating the exact position of the associated spot 164 along the x axis. The resolution of measurement depends upon the spatial resolution of the dispersion device and the detector array. The output of a spectrum analyzer is generally regarded to have too low a spatial resolution to meet the requirements for FBG based systems. However, in accordance with the invention, resolution can be greatly improved by employing any one of a number of known digital interpolation algorithms so that a strain measurement resolution to near micro strain may be achieved.

According to the invention, the FBGs are usually fabricated using holographic or phase mask techniques to expose a germanium doped (and sometimes boron co-doped) optical fiber to a periodic intensity distribution. These fibers are photosensitive, meaning that their refractive indices change when they are exposed to UV light. Because of this photosensitivity, the impinging sinusoidal intensity distribution results in a sinusoidal refractive index distribution in the fiber core. The combined effect of the periodic index distribution is to reflect light at a very specific wavelength known as the "Bragg wavelength". This wavelength is predictable in terms of the mean refractive index, $\eta$, and the pitch of the periodicity, $\Lambda$, by $\lambda_B=2\eta\Lambda$. Sensors are made from these gratings by taking advantage of the fact that the grating pitch and refractive index are both functionally dependent on strain. Therefore strain on the grating causes the Bragg wavelength to shift left or right. The wavelength encoded nature of FBGs offers the greatest potential for multiplexing in wavelength domain along a single length of optical fiber. Multiplexing is accomplished by producing an optical fiber with a sequence of spatially separated Bragg gratings, each having a different pitch, $\Lambda_k$, k=1, 2, 3, . . . n. The resulting Bragg wave-lengths associated with each pitch are therefore given by $\lambda_{Bk}=2\eta\Lambda_k$, k=1, 2, 3, . . . n. Because the unstrained Bragg wavelength of each FBG is different, the information from each sensor is individually determined by examining the wavelength spectrum. For example, where a strain field at grating 16-2 (124-2) is uniquely encoded as a perturbation to Bragg wavelength 12. The Bragg wavelengths associated with the other gratings remain unchanged.

FBGs are the natural sensor of tensile strain when they are attached on or embedded in the host material. However. FBGs can be adapted to detect a wide range of other physical parameters by converting the change of the relevant parameter into strain. For example. FBGs can be used to measure humility by coating the FBG with a layer of hydrogel, which expands upon water absorption thus converting humility into strain. Similarly, a FBG can become a hydrogen sensor by coating it with a layer of Pallandium, which expands after absorbing hydrogen. The use of FBGs for pressure sensing can be achieved where gratings are written into fibers with side cavities. This fiber structure converts side pressure into axial stain at the core of the fiber. Because both the grating pitch, $\Lambda$ and refractive index $\eta$ change with the temperature, the Bragg wavelength of a FBG shifts with the temperature by approximately 1.7 pm/° C. This, makes FBG a temperature sensor. However, no matter which measurement that the FBG is adapted to detect, its output has to be temperature compensated if the original signal is below 20 Hz.

Charge-coupled devices (CCDs) have been widely accepted for solid state image sensing. However, image sensors based on complementary metal-oxide semiconductor (CMOS) technology are becoming a major challenger to CCDs in the solid state imager field. All solid state image sensors comprise a one or two dimensional array of photosensitive elements or pixels, integrated on a semiconductor substrate. Each element produces electronic charges in response to the photon energy incident on the pixel. Additional electronic circuitry is constructed on the same substrate to read out these charges as a voltage signal. The primary difference between CCD and CMOS imagers is the way that these photon induced charge packets are read out. In a CCD, charge packets are brought to an output amplifier by coupling through a series potential wells pixel by pixel in a sequential manner. Consequently, the CCD has to read through every pixel in the entire array in order to find out photon signal at a particular pixel. As a result, the frame rate of a CCD imager can not be very fast. Most industrial CCD cameras have standard frame rate of 30 Hz or 25 Hz. CMOS technology can randomly access information at a specific pixel individually, which makes it ideal for some special applications such as missile tracking, where the area of interest is only a small portion of the image and the event is too fast to wait the entire image to be read out. Such random accessibility provides crucial performance enhancement for FBG interrogation instrument herein described.

The CMOS technology is the standard in the making of semiconductor chips, which is used to fabricate almost more than 90% of VLSI circuits, from powerful microprocessors to memory chips. Because of this, CMOS image sensors enjoy the key advantages over CCDs namely, low cost, miniaturization, lower power consumption and enhanced funtionality.

In one embodiment of the invention, a CMOS random access imager is commercially available under the name FUGA image sensor series produced by IMEC and marketed by C-Cam Technologies. A FUGA15c has 512×512 square pixels with 12.5 u.m. pitch; full digital operation, for both input and output signals, i.e. an 8 bit gray scale data at a specific pixel can be obtained by providing the chip with 9 bit X and Y coordinates; maximum pixel rate 5 MHz with 50 mW power dissipation: and logarithmic light intensity to voltage conversion with a dynamic range over 50 dB.

Photobit Inc. based in California has plans to market a scientific grade (16 bit gray scale), random access. 512×512 pixel CMOS imager. NASA Jet Propulsion Laboratory (JPL) in California has demonstrated such a chip at 2048×2048 format. Futhermore, there is another image sensor technology termed charge-injection devices (CID), which is also potentially capable of random pixel access. Products with 512×512 pixels and 16-bit gray scale have also been demonstrated. It is estimated that these products will be comnmercially available in two or three years time.

In target tracking applications, the precise position of a point object on the image sensor has to be measured precisely. As shown in FIGS. 1C & 1D, the intensity profile of such an object normally spreads over a cluster of pixels on the imager. There are a number of interpolation algorithms available, which make use of this intensity distribution to calculate the center of the profile to sub-pixel precision. Among them, the centroid algorithm, noted above, is the most mature and versatile method because it simply calculates the "weight center" of the profile, thus does not have to know the shape of the profile in advance. The algorithm will work even when the profile is asymmetric, as long as it is stable. Using a two-dimensional (2D) centroid method, the precise position of the object along X coordinate (pixel rows), $x_c$, is calculated as:

$$x_c = \Sigma_i i(\Sigma_j g_{ij})/\Sigma_i \Sigma_j g_{ij}$$

where i, j is the column and raw number of a particular pixel in the imager, g is the gray scale, i.e. pixel output at this pixel and all the sum are within the cluster boundary.

The precision of this algorithm depends on the stability and shape of the intensity profile, the size of the pixel cluster used for calculation and the pixel noise and uniformity of the imager. A resolution of 1/83 pixel has been achieved in preliminaryl research using a low cost, industrial grade CCD camera and a 1/100 pixel resolution has been reported. Generally a larger spot ends to yield a better resolution because of the averaging effect. However, study has shown that interpolation resolution no longer improves when the spot becomes larger than a particular cluster size, which is termed the "optimum cluster size". Naturally, higher the imager quality (in terms of pixel noise and uniformity), the smaller the optimum cluster size. For industrial grade CCD camera with 9-bit gray scale, the optimum cluster was tested to be 4×4 pixels.

A smaller optimum cluster is advantageous because the processing speed of the interpolation (including pixel read-out and computation) depends on the size of the spot cluster. According to the above equation, for a spot at size of K×K pixels, the processing time is approximately proportional to $K^2$. The processing speed can be increased by using pixels for the calculation. An obvious option is to use only the one row of the pixels (row J) that are near the center of the spot and to employ an alternative one-dimensional (1D) centroid algorithm, which is expressed as:

$$x_c \approx x_{cJ} = \Sigma_i i g_{iJ}/\Sigma_i g_{iJ}$$

Of course, the interpolation resolution will be reduced accordingly.

As depicted in FIG. 2, light from a broad band source is split into many single mode fibers (or termed "fiber channels") by a star coupler. Along each fiber, there are a number of FBGs with pre-determined different, Bragg wavelengths. FBGs on different fibers, however, can have the same wavelengths. Light reflected from the FBGs in each fiber channel is coupled into a down-lead fiber via a 1×2 coupler and sent to the interrogation instrument. The instrument is basically a compact, two-dimensional (2D) optical fiber spectrometer. It can have two possible configurations. The first configuration is shown in FIG. 2. A second configuration, schematically shown in FIG. 3 is termed "transmission configuration" because the light arriving at the image sensor is transmitted through the FBGs instead of reflected by them. In both configurations, a 2D, random access image sensor is placed at the output port of a wavelength dispersion device. In addition, the end-faces of all the down-lead fibers are arranged to form a line L positioned at the input port. Furthermore, the image sensor chip is positioned in such a way that its pixel columns (Y-axis) are parallel to the grooves of the bulk grating in the spectrometer and to the line of the fiber end-faces. The digital output of the imager is sent to a computer for processing.

The imaging system of the spectrometer separates light from different fibers and distributes them along pixel columns of the 2D image sensor (Y-axis). Because of the effect of the bulk grating dispersion device, the light at different wavelengths will be diffracted onto different directions along X-axis, hence form bright spots at different positions along pixel rows of the image sensor. Therefore if the system has m fiber channels and n FBGs of different wavelengths along each fiber, there will be a mxn matrix of discrete spots on the image sensor array. A column of such spots in the matrix represents FBGs of the same or similar wavelength in different fiber channels, and a row represents different FBGs along the same fiber. In other words, for each FBG, the spatial position of its fiber channel is encoded into the position along Y-axis of the imager while its wavelength is encoded along X-axis. The precise central wavelength of a FBG sensing node can therefore be detected by locating the exact position of the associated spot along X-axis of the imager pixel array.

Because of the random accessibility of the CMOS imager used, any FBG in the network can be addressed in a truly random fashion by simply read out only the relevant pixels and calculate its centroid along X axis. This unique feature not only adds great flexibility in application but also enables the system to utilize its resources efficiently resulting in quantum performance enhancement.

The Bragg wavelength of a FBG changes with the temperature by about 1.7 pm/° C., translating to 2 $\mu\varepsilon$/° C. false strain signal at 830 nm region. For applications where the wanted signal is below 20 Hz, this temperature induced variation has to be compensated. Although techniques to separate temperature and strain induces signals at the same pint have been reported. They are either not accurate or require different sensors that are not based on FBG, thus are difficult to be integrated into the proposed network. Most practical applications do not require on-the-spot temperature compensation because be temperature field can be effectively monitored using only a small number of dedicated temperature sensing nodes. One method shown in FIG. 5A is to loosely house one or two fiber channels with FBGs in a small diameter (2 mm) tube and attach the tube to the structure. In this way, the FBGs in the tube are only affected by the temperature field and their outputs can be used to compensation the temperature induced changes in other FBGs. This method works in many applications. However, in some applications, all sensing nodes have to be embedded into the host structure. Sometimes the tube method can not be used because of its relatively large diameter and incompatibility with the host material. According to the invention, a dedicated temperature sensor is produced, the output of which is not affected by structure strain even if it is embedded into the material.

Figure 4A:
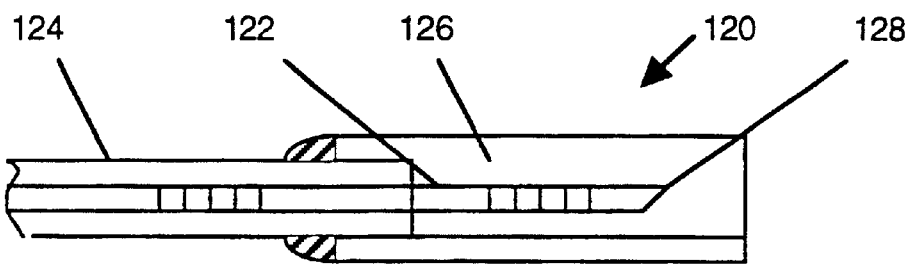
FIG. 4A is an illustration of a strain and temperature separated sensor on the end of a fiber.

As shown in FIG. 4A, an embeddable FBG temperature sensor 120 is fabricated by splicing a FBG made on a short 80 $\mu$m fiber 122 diameter fiber on to a 125 $\mu$m diameter fiber 124 and encapsulating it inside a 250 $\mu$m silica tube 126. The free end 128 of the 80 $\mu$m fiber is cleaved into an angle to reduce the unwanted Fresnal reflection. This sensor structure ensures that the FBG will free from tensile strain even it is embedded into the host material. Of course, such a sensor can only be placed at the end of each sensing fiber. So there will be maximum n dedicated temperature sensing nodes in the sensor network.

Figure 4B:
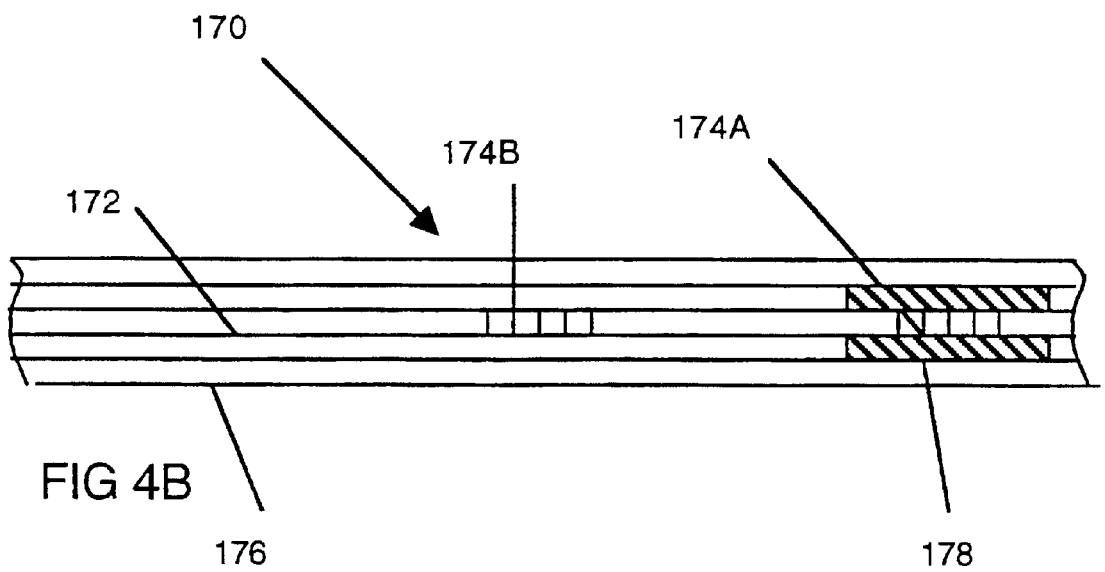
FIG. 4B is a schematic illustration of a strain and temperature separated inline sensors.

Alternatively, as shown in FIG. 4B an in line temperature compensated strain sensor 170 may be made by filling a fiber 172 having a plurality of FBGs 174A, 174B in a tube 176. The FBG 174A is glued to the tube at 178, or attach their two by other means. Meanwhile, FBG 174B is loose in the tube. As a result, the output signal of FBG I 74B is independent of the stress and can be used to compensate the temperature induced variation in the signal of FBG 174A.

By properly selecting the groove density of the bulk grating, the width of the 2D image sensor can just cover the spectral bandwidth full width having maximum (FWHM) of the source. The spectral resolution $\Delta\lambda$ of the measurement of a FBG wavelength can then be expressed by the following equation: $\Delta\lambda=WE/C$ where W is the FWHM of the source, C is the total number of the effective pixel columns in the image sensor chip and E is the sub-pixel interpolation resolution. At the hardware level, the resolution can be enhanced by choosing a source with smaller FWHM and an imager with larger number of pixel columns. However, there is a tradeoff with the scale because a wider FWHM enables more FBGs to be incorporated along a fiber channel. Since the CMOS imager is based on silicon, it has a characteristic photo sensitive region of 400 nm 1,000 nm with sensitivity peak at around 800 nm. Superluminescent diodes (SLD) with FWHMs as wide as 60 nm are available in this wavelength. However, most SLDs in this region have a typical FWM of 15 nm, and they are much more powerful than SLDs with wider FWHMs.

The tradeoff between the sub-pixel resolution, E, and the system speed lies in the pixel cluster size of the bright spot on imager produced by a FBG. A larger pixel cluster tends to improve E because of the averaging effect but inevitably reduces the speed that a spot is read out and processed. Even the spot size has been chosen by hardware design, the balancing point of this tradeoff can still be shifted to a wide margin by intentionally read out only part of the pixels in the cluster for centroid calculation.

The maximum number of FBG based sensors that can be accommodated by the system depends on the number of FBGs multiplexible along a single fiber channel and the number of fiber channels addressable by the interrogation instrument. Referring back to the operating principles of FBG based sensor systems, a FBG at Bragg wavelength $\lambda_b$ moves within a spectral range of $R_c\lambda_b$ in response to a $R_c$ strain range. Many systems can only provide a fixed spectral window for each FBG. The width of these windows has to be at least $R_c\lambda_b$ in order to prevent cross talk between FBGs. The number of FBGs multiplexible along a fiber channel, N, can thus be expressed as $N=W/(R_c\lambda_b)$ where W is the FWHM of the source as before. Considering $R_c=6000$ $\mu\epsilon$(3000 $\mu\epsilon$), W=38 nm and $\lambda_b=830$ nm, the maximum number of FBGs multiplexible along a fiber channel is 7. However, it is highly desirable to multiplex more FBG sensors along a fiber to make full use of the one-dimensional nature of the media. In practice, the strain at a particular position on the structure can be estimated to certain accuracy. It is therefore reasonably possible to arrange the FBGs in such a way so that the strain different between two spectrally adjacent FBGs along the same fiber does not exceed a much smaller range ($\Delta R_c=1000$ $\mu\epsilon$). Because the spectral windows in the proposed system can be flexibly shifted along the pixel row, we can replace $R_c$ in the above equation with $\Delta R_c$ and the number of FBGs multiplexible along a fiber can be increased to around 45.

The maximum number of fiber channels that the system can accommodate, M, can be expressed as $M=R/(2K)$ where R is the number of rows in the imager and K is the spot cluster size. The separation between two rows of spots is set as twice of the spot size to prevent cross talk between FBGs. For K=5 and R=512, M=51. This means that an instrument with 512×512 imager is capable of multiplex a total of M×N=2295 FBGs.

The maximum sample rate to any FBG in the array is limited by the photoreceptor time constant of the imager, which is inverse proportional to the light density on the pixel. From the data provided by the manufacturer, the maximum sample rate can be expressed as $f_{mx}=(d/8)\times10^5$ (Hz) where d is the average light density within a bright spot on the imager. In the invention, this density can be expressed as:

$$d = e\frac{P}{4M}\frac{w}{W}\frac{1}{K^2p^2}$$

where P is the total output power of the source, w the spectral FWHM of a FBG, p the pixel pitch and e the power efficiency of the entire optical system, which includes the insertion loss at couplers, bulk grating efficiency, and other features.

One 15 nm FWHM, single mode fiber pigtailed. SLD has a typical output power of 400 $\mu$W. P is therefore 800 $\mu$W over W=38 nm bandwidth for the compound source combining the above two equations and assuming w=0.2 nm, K=5, p=12.6 $\mu$m and e=10%, maximum sample rate can be calculated to be $f_{mx}=331.5/M$(kHz). This equation represents a tradeoff between the maximum speed and scale. At the maximum scale (M=51), the maximum sample rate is 6.5 kHz.

The scale and speed figures presented above are exemplary maximums. The actual achievable scale and speed of the system are most likely limited by the system time budget. Although every FBG sensors in the proposed system can be addressed independently, they all complete for one important system resource: time, which can be budgeted using the following expression: $\Sigma f_i t_i \leq 1$ (second) where subscript i represents a particular FBG in the network, f is the sample rate for that FBG, t is the time taken for one sample. While f must be smaller than the maximum sample rate discussed above, the t is limited by pixel rate of the imager or the computation time to calculate the centroid. Because the data acquisition and calculation can be done in parallel, the slower of the two sets the limit.

The time taken to access a FBG, t, can be expressed as $t=G/f_p$ where $f_p$ is the pixel read-out rate of the CMOS imager and G is the total number of pixels the computer has to read for centroid calculation. Because the light spot is constantly moving along pixel row of the imager and the computer has to first locate the cluster before reading out relevant pixels. This is a necessary operation overhead. There are many ways to find out the location of the cluster with minimum overhead. The most conservative method would be to read out a row of pixels near the center of spots and locate clusters by a preset threshold. The average number of pixels the computer has to read for locating a cluster is then R/N, where R is the number of pixel rows in the CMOS imager and N is the number of FBGs along a fiber channel. After the cluster is located, an additional K(K−1) pixels have to be read before the centroid calculation can be carried out if the 2D centroid algorithm is used. For 1D centroid method, no more pixel read is required.

The FUGA15c has a pixel rate of 5 MHz and R=512. Assuming N=45 and K=5, we can calculate G=12 and the access time for one FBG in the proposed system as 2.4 $\mu$s or 6.4 $\mu$s using 1D or 2D centroid algorithm, respectively. Therefore, sensor access time is roughly in reverse proportion to the sub-pixel interpolation relolution.

The time to calculate the centroid of a 5×5 cluster using a high level language program is approximately 7.6 μs on a Pentium 200 MHz PC without MMX. It is estimated that the processing speed can boost at least four-fold by program streamlining. With the fast advance of microprocessor technology, there is plenty of computing power available so that computation time can be easily brought down to a level well below the FBG access time and will therefore not become the bottleneck of the system speed.

While there has been described are what are considered to be exemplary embodiments of the invention. It will be apparent to those skilled in the art that various changes and modifications may be made therein without departing from the invention. It is intended in the attached claims to cover such changes and modifications as fall within the true spirit and scope of the invention.

We claim:

1. A digital spatial and wavelength domain system for multiplexing fiber Bragg grating (FBG) sensors comprising:

a plurality of optical fibers, each including a plurality of fiber Bragg gratings (FBG) therein, each FBG having selective center wavelength being variable in accordance with strain for reflecting or transmitting light at the corresponding center wavelength in accordance with the strain thereat;

means for providing broad band light illumination for the FBGs;

means for each optical fiber for carrying the light to a selected location;

a wavelength dispersion device responsive to the light from each of the fibers for wavelength separating the light in each said fiber into the center wavelengths in accordance with the location of each fiber so that the selected location of each fiber and the wavelength separated light provides spatially independent signals for each FBG in each optical fiber.

2. A digital and spatial wavelength domain system comprising a plurality of optical fibers, each including a plurality of fiber Bragg gratings (FBGs), each having a center wavelength;

a broad band light source for illuminating each FBG;

each of said FBGs being operative for reflecting a portion of the light at the center wavelength corresponding thereto in accordance with a stress applied to said fiber thereat;

a wavelength dispersion device operatively coupled to each fiber and responsive to the light for separating the light in each said fiber into a sensible signal at the corresponding wavelength for each FGB; and optically sensitive solid state means spatially responsive to the sensible signal for producing an output for spatially separating the signals at each wavelength.

3. The device according to claim 2 wherein the wavelength dispersion device comprises a bulk grating.

4. The device according to claim 3 wherein the grating comprises a mirror lens having a focal plane and a grating disposed on a reflective surface thereof.

5. The device according to claim 4 wherein the grating includes parallel grooves formed in the reflective surface.

6. The device according to claim 2 further comprising fiber means for carrying the light from the plurality of said optical fibers to said wavelength dispersion device, said fiber means having output ends aligned in a linear array.

7. The device according to claim 2 wherein the optically sensitive means comprises a solid state sensing device including a plurality of pixels arranged in a two dimensional array.

8. The device according to claim 7 wherein the pixels are randomely accessible.

9. The device of claim 2 wherein the imaging device includes a 2D array of pixels and wherein the wavelength separated light impinges on the array at selected pixel locations.

10. The device of claim 9 wherein the light from the impinging light forms a spot on the imaging device covering a plurality of pixels and further including processing means for sensing the light in each of said pixels and weight averaging the light for determining a centroid of said spot corresponding to the center wavelength thereof.

11. The device of claim 2 comprising at least one strain independent sensor means for each fiber for providing a temperature calibration signal at a selected center wavelength.

12. The device of claim 11 wherein each of said plurality of optical fibers has a free end remote from the source, and the strain independent sensor means is disposed at the free end of each of said fibers.

13. The device of claim 12 wherein the strain independent sensor means is within the fiber.

14. The device of claim 2 further comprising means for at least one of detecting the center wavelength for each wavelength separated signal in accordance with at least one of centroid weighting;

curve fitting; and linear and higher order interpolation.

15. The device of claim 2 further comprising carrying means for carrying the light to the wavelength dispersion device.

16. The device of claim 15 wherein the carrying means comprises a down-lead fiber for each optical fiber.

17. The device of claim 15 wherein the carrying means comprises a free end of the optical fibers.

18. The device of claim 2 further comprising distributing means for distributing the light to each optical fiber.

19. The device of claim 18 wherein the distributing means comprises a star coupler.

* * * * *